United States Patent [19]

Mayhew, Jr.

[11] Patent Number: 4,646,407
[45] Date of Patent: Mar. 3, 1987

[54] METHOD OF MAKING CORROSION RESISTANT VALVE

[75] Inventor: John D. Mayhew, Jr., Salem, Va.

[73] Assignee: Alphabet Inc., Warren, Ohio

[21] Appl. No.: 705,947

[22] Filed: Feb. 26, 1985

[51] Int. Cl.[4] .................... B29C 45/14; F16K 3/02
[52] U.S. Cl. ................................ 29/157.1 R; 29/460;
     264/269; 264/328.16; 264/127
[58] Field of Search .............. 264/127, 259, 267, 269;
     29/157.1 R, DIG. 29, 460

[56] References Cited

U.S. PATENT DOCUMENTS

| 3,026,899 | 3/1962 | Mischanski | 137/375 |
| 3,206,530 | 9/1965 | Boteler | 264/269 |
| 3,407,838 | 10/1968 | Boteler | 264/269 |
| 3,438,388 | 4/1969 | Shenck, Jr. | 137/375 |
| 3,459,213 | 8/1969 | Schenck, et al. | 137/340 |
| 3,545,480 | 12/1970 | Gustafson | 137/375 |
| 3,825,030 | 7/1974 | Kalsi | 264/269 X |
| 4,377,274 | 3/1983 | Mayhew | 251/327 |

OTHER PUBLICATIONS

DuPont, "Injection Molding Guide for Melt Processible Fluoropolymers".
DuPont, "Chemical Use Temperature Guide".
DuPont, "Safety in Handling and Use", Tefzel.
Preliminary Information from Technical Services Laboratory about DuPont Teflong (Fluorocarbon Resin and DuPont Tefzel Fluoropolymer), PIB #36 (Revised).

Primary Examiner—James Lowe
Attorney, Agent, or Firm—Griffin, Branigan, & Butler

[57] ABSTRACT

A method of constructing a gate valve includes the step of placing a slidable valve gate (46) in a valve cavity (16) between aligned holes (21) of a valve body (10) in a position for closing a fluid passage through the body. Removable mold fixtures (22, 24 and 26) are attached at each opening into the valve body for covering it and thereby preventing liquid material from flowing out of the hole. The valve body (10) and its attachments are heated and a molten resinous material is inserted into the valve cavity so as to surround the aligned holes (21) and to fill spaces between the body (10) and the valve gate (46). The valve body and the resinous material are then allowed to cool so that the resinous material hardens to form a valve liner in which the valve gate moves for opening and closing the fluid passage (80). The mold fixtures are shaped to form flange rings (76, 78) outside the valve-body openings and to form a cavity (84) for packing material (86). A fluoropolymer is used as the resinous material.

9 Claims, 3 Drawing Figures

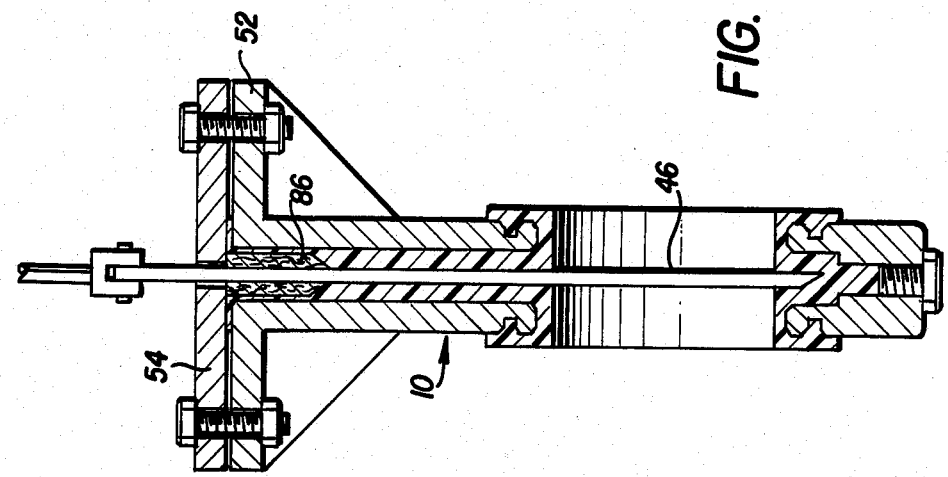
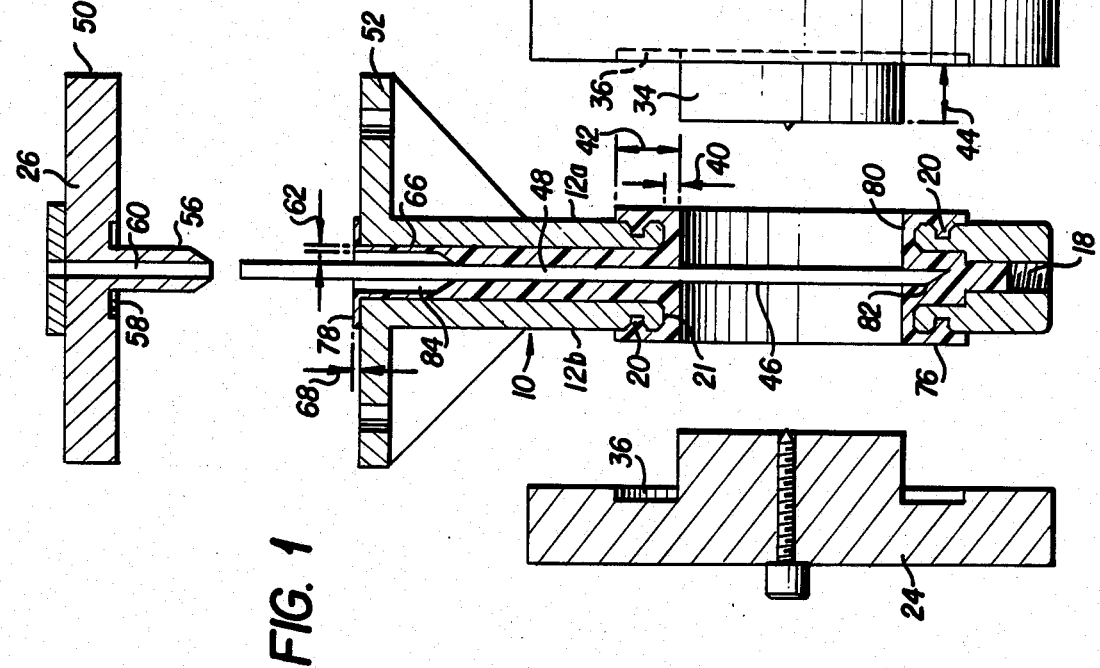

METHOD OF MAKING CORROSION RESISTANT VALVE

BACKGROUND OF THE INVENTION

This invention relates generally to the art of making corrosion resistant valves, and more particularly, to a method of making a knife gate corrosion resistant valve.

The desirability of specially constructing corrosion resistant valves has long been recognized where valves are to be used for such things as highly active chemicals, acids, bases, solvents, gasoline and the like. A difficulty encountered in constructing such valves is that materials which are resistant to corrosion are often expensive and/or weak so that it is normally difficult and expensive to construct valve members out of such materials. One common practice in constructing corrosion resistant valves is to employ inexpensive frames or housings which have corrosion resistant linings covering those surfaces to be contacted by corrosive fluid materials.

For example, U.S. Pat. No. 3,545,480, describes a rather popular valve in which corrosion-resistant, sheet metal liners are first constructed and then a cast valve body is machined to fit the liner. A valve seat is then attached to the liner at the throat of the valve. The liner described in this patent is constructed in sections and is then assembled. It is easy to see that this construction, although saving money by not using expensive materials for the body is still unduly expensive because of the time necessary for machining parts, assembling the liner members and attaching the valve seat. Further, this valve only works in one direction inasmuch as it only has a valve seat on one side of the gate. Still further, a problem with this valve is that, since the liner is constructed of elements which must be assembled, cracks are left between the liner elements which must be filled by welding or with plastics. Thus, it is an object of this invention to provide a method for making a corrosion resistant valve in which a liner is to be made of only one piece and in which the liner is combined with a body without undue amount of work to adapt these two members to fit one another. It is also an object of this invention to provide such a method of making such a valve which produces a valve which can be used to cut off flow in either direction. Still further, it is an object of this invention to provide a method of making a valve in which a valve seat is produced simultaneously with producing the liner.

It has been suggested to use fluorocarbon resin liners for valves, and other conduit, bodies. Such suggestions are made in U.S. Pat. Nos. 3,206,530 to Boteler, 3,438,388 to Schenck and 3,026,899 to Mischanski. In each of these cases, the liner is intended to protect a body, or housing, from corrosive liquids passing through the valve body. Boteler (U.S. Pat. No. 3,206,530) mentions that the liner can be molded in the valve body housing or separately therefrom. Schenck (U.S. Pat. No. 3,438,388) heats a tube of fluorocarbon resin which he then pressurizes against the walls of a valve body using a pressurized gas. In these cases valving elements are combined with gaskets, valving-element liners and the like at the interface between the valving element and its seat. It is an object of this invention to provide a method of forming a corrosion-resistant valve in which a liner can be constructed to closely interface with a valving element in one step so that no gaskets, seats, valving-element liners or other sealing members are necessary in order to control flow through a valve flow passage. It is also an object of this invention to provide a method for making a corrosion resistant valve which works in two directions in one step.

It is yet a further object of this invention to provide a method of making a corrosion-resistant valve which is extremely inexpensive since it does not require undue machining of parts, but yet which provides excellent operation characteristics and an unusual amount of durability.

SUMMARY

According to principles of this invention valving element is placed in a valve body. The flow passage openings of the valve body are closed by attaching mold fixtures to the valve body covering these openings. In addition, a mold fixture is attached to the valve body to cover the opening surrounding a valve actuator passing through the valve body to the valving element. Thereafter, the valve body, the valving element and the mold fixtures are heated and a resinous material is injected into the valve cavity so as to surround the valve body openings forming the fluid passage and the valving element and to fill any unused cavities in the valve body. The valve body, the valving element, and the resinous material are allowed to cool so that the resinous material hardens to form not only a valve-member track and liner, but valve seats and filler material which prevents extraneous material from hardening in cavities of the valve body and thereby causing valve jamming. In a preferred embodiment, a fluoropolymer resin is employed and the mold fixtures are shaped to form the fluid passage and to form a cavity for packing.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is an exploded sectional view of a gate-valve body, a gate, mold fixtures employed with the valve body, and hardened resinous material which has been molded in accordance with the method of this invention to form a valve liner;

DESCRIPTION OF THE PREFERRED EMBODIMENT

Figure 2:
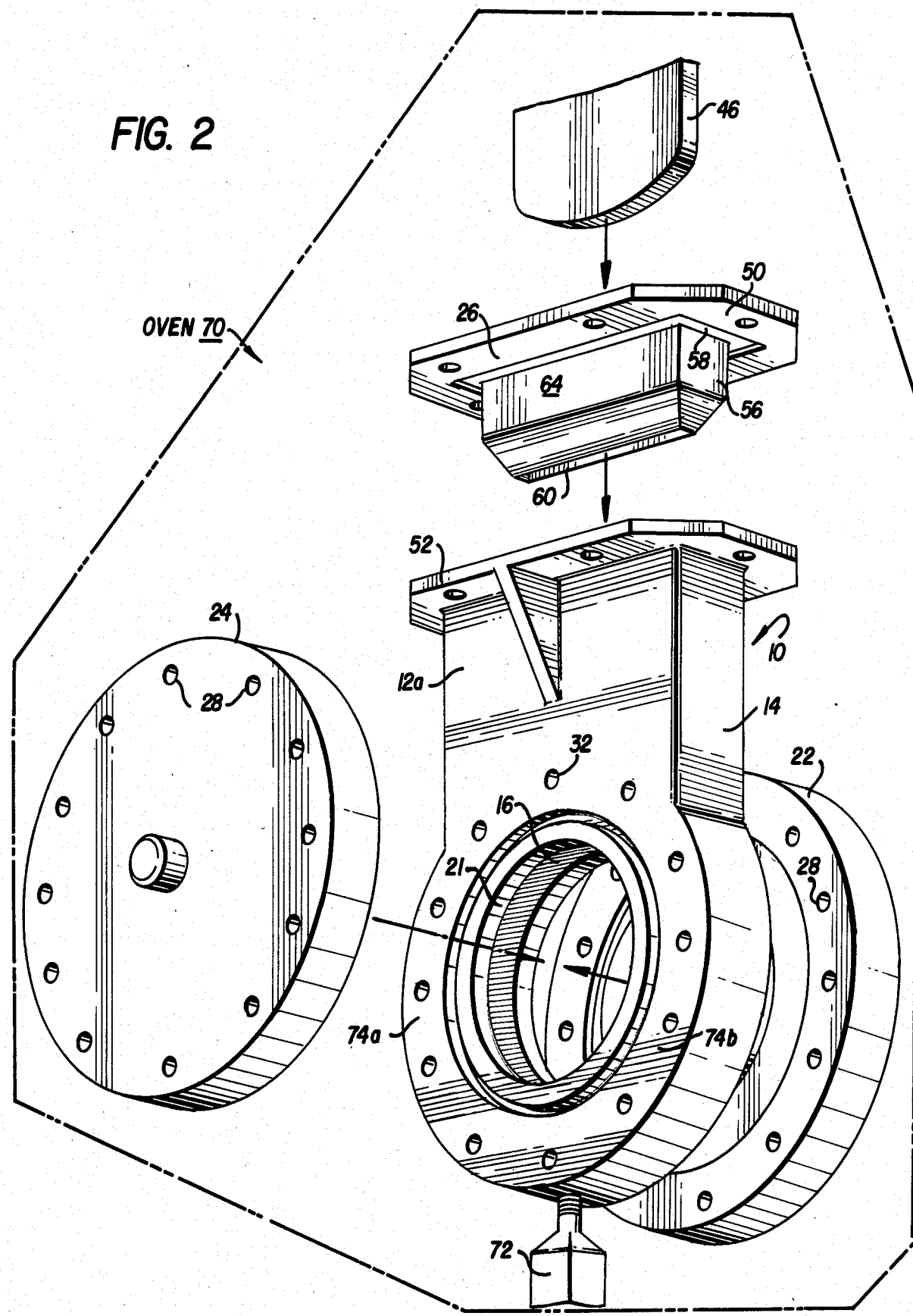
FIG. 2 is an isometric view of the apparatus of FIG. 1 with resin injection apparatus and an oven being shown in schematic form; and, FIG. 3 is a sectional view of a valve made using the method of this invention.

In a preferred embodiment of the method of this invention, it is used with a knife gate valve of the type described in U.S. Pat. No. 4,377,274 to Mayhew and the disclosure of the valve in that patent is incorporated herein for any details of such a knife gate valve not disclosed herein.

Basically, FIGS. 1 and 2 illustrate a method according to this invention of consructing a corrosion-resistant knife-gate valve and FIG. 3 depicts a completed such valve.

According to the depicted method of valve construction, one starts with a valve body 10, having two rigid side plates 12a and b connected by a rigid edge wall 14 forming a valve cavity 16. This valve body is substantially the same as the knife-gate valve body described in U.S. Pat. No. 4,377,274 with the exceptions that it also includes a fluid-resin inlet 18 and gripping groves 20 about fluid-passage aligned holes 21 in the rigid side plates 12a and b.

Special tools used in the practice of this invention include fluid passage mold fittings 22 and 24 and a gate passage mold fitting 26. According to practice of the preferred method of this invention, the fluid-passage mold fittings 22 and 24 are bolted to external surfaces of the rigid side plates 12a and b by using bolts passing through holes 28 in flanges 30 of the fluid-passage mold fittings 24 and 26 which align with internally threaded pipe mounting holes 32 on the rigid side plates 12a and b. The fluid-passage mold fittings 22 and 24 are identical, with each having the flanges 30, a fluid passage projection 34, a ring groove 36 encircling the fluid passage projection 34, and a threaded gate positioning screw 38 extending through a threaded bore in the middle of the fluid-passage mold fitting. The fluid passage projection 34 is round, as can be seen in FIG. 2, but is sized to be somewhat smaller than the round fluid-passage aligned holes 21 in the side plates 12a and b. When the fluid-passage mold fittings 22 and 24 are bolted to the side plates 12a and b each fluid passage projection 34 is centered in its respective aligned hole 21 but is spaced therefrom by a distance 40. The ring groove 36, which surrounds the fluid passage projection 34 leaves a space on the outside surface of the rigid side plates 12a and b surrounding the aligned holes 21 which extends outwardly a distance 42. The axial length 44 of the fluid passage projection 34 is such that it will extend approximately to, but not further than, a centered valve gate 46. Thus, the two fluid-passage mold fittings 22 and 24 mounted on opposite rigid side plates 12a and b will hold a valve gate 46 in the center of the valve cavity 16. As a practical matter, in order to reduce the necessity for making the various members to a high degree of accuracy, and perhaps avoiding undue machining, the fluid passage projections 34 are slightly shorter than is required to hold the valve gate 46 exactly in the center of the cavity, thus, the gate positioning screws 38 are used for this purpose.

The gate-passage mold fitting 26 also has a flange 50 which is bolted to threaded holes 51 in an upper flange 52 of the valve body 10 which are normally used for attaching a cap 54 (FIG. 3) to the valve body 10 with bolts 55. The gate-passage mold fitting 26 includes a packing extension 56 which is surrounded by a ring groove 58 in the flange 50. The packing extension 56 and the flange 50 have a gate-receiving passage 60 therethrough of a size for snugly receiving a normal valve gate 46 therein. The outer dimensions of the packing extension 56 are such that when the packing extension 56 is centered in the upper end of the valve cavity 48 a small space 62 is left between the outer surfaces 64 of the packing extension 56 and the inner surfaces 66 of each of the side plates 12a and b and the edge wall 14. When the gate-passage mold fitting 26 is bolted to the upper flange 52 of the valve body 10, the packing extension 56 is so centered and the ring groove 58 provides a space 68 on the upper surface of the upper flange 52 which coamunicates with the small space 62.

Numeral 70 in FIG. 2 schematically illustrates an oven in which the valve body 10, the fluid-passage mold fittings 22 and 24, the gate-passage mold fitting 26, and the gate 46 are placed during the practice of the method of this invention.

In the preferred embodiment, the valve body 10, including side plates 12a and b and edge wall 14 are constructed of forged steel or cast iron. The mold fittings 22, 24 and 26 are also constructed of forged steel or cast iron, however, these elements are nickel plated in order to avoid corrosion over extended use. The valve gate 46 is constructed of titanium or stainless steel.

According to the method of this invention, the fluid-passage mold fittings 22 and 24 and the gate-passage mold fitting 26 are bolted to the slightly modified valve body 10 as indicated in the exploded views of FIGS. 1 and 2. At the same time, the valve gate 46 is covered with a mold-release agent and is centered in the valve cavity 48 of the valve body 10 and this centering is fine tuned to the point necessary by gate positioning screws 38. At this point, the valve body 10 as well as the attached mold fittings 22, 24 and 26 and the gate 46 are placed, vertically-oriented, in the oven 70, which can be stationary or on some type of movable assembly line, and heated to between 450° F. and 600° F. Thereafter, a molten, at around 650° F., fluoropolymer resin is injected by an injector 72 (schematically illustrated but can be a simple cylinder and piston) into the fluid-resin inlet 18 at a pressure from 700 psi to 2,000 psi to completely fill any remaining spaces of the valve cavity 48 and those spaces which are made available by the fluid passage mold fittings 22 and 24 and the gate passage mold fitting 26. Having the body 10 slightly cooler than the resin helps to "set up" the resin better. During this resin injection step, air can escape from the mold fittings which are not airtight. In this respect, since the fluid-resin inlet 18 is geometrically centered on the housing 10 and the valve body 10 is vertically oriented as depicted in FIG. 1, the resin climbs throughout the housing in a geometric manner, passing at the same time through opposite arms 74a and b on opposite sides of the aligned holes 21 and evenly rises in the housing 10 until finally reaching the gate-passage mold fitting 26. The resin completely fills all spaces on both sides of the valve gate 46 and extends into the ring grooves 36 and 58 (including into gripping grooves 20) to form sealing rings 76 and 78 about the aligned holes 21 and the hole into which the gate 46 is inserted. Also, the resin is shaped by the fluid passage projections 34 of the fluid-passage mold fittings 22 and 24 to form a fluid passage 80. Still further, the resin is shaped by the gate 46 to form gate seats 82 all about the gate at the fluid passage 80. The packing extension 56 of the gate-passage mold fitting 26 shapes the resin to form a packing cavity 84.

Thereafter, the body 10, and its attachments, are removed from the oven 70 and/or allowed to cool so that the fluoropolymer resin is allowed to harden in this position. Thereafter, the fluid-passage mold fittings 22 and 24 and the gate-passage mold fitting 26 are unbolted and removed. Packing 86 (FIG. 3) is inserted into the packing cavity 84 and a normal cap 54 is bolted to the upper flange 52 as is depicted in FIG. 3.

Since the valve gate 46 was covered by a mold release agent prior to the fluoropolymer resin being inserted into the housing 10, and since the hardened resin shrinks a few thousandths of an inch from the gate 46, the gate 46 can easily be moved within the hardened fluoropolymer resin to open and close the fluid passage 80. With regard to the fluid passage 80, it might be necessary to cut some flashing away from this passage formed by resin which crept between the outer end of the fluid passage projection 34 and the side surfaces of the gate 46 prior to using the valve. Similarly, it may be necessary to cut flashing from other external areas where resin crept between mold fittings and the housing 10. One can employ a threaded plug at the fluid-resin inlet 18 once the resin injector 72 is removed therefrom, however, if resin is allowed to harden in the fluid passage 80, this should not be necessary for normal pressure valve usages. The sealing ring 78 acts as a gasket between the cap 54 and the upper flange 52 of the valve body and the sealing rings 76 act as smooth surface gaskets for contacting the flanges of pipes attached at the pipe-mounting holes 32 to the rigid resinous side plates 12a and b. Also, these sealing rings 76 act to pull the liner against the internal surface of the body when the resin hardens and shrinks In the preferred embodiment of this invention, a fluoropolymer resin made by DuPont and designated by the Trademark "TEFZEL" is used. The characteristics of this material are described in existing literature such as DUPONT, Injection Molding Guide for Melt Processible Fluoropolymers and these characteristics are incorporated herein by reference. One material that can be used as a mold release agent is designated by DuPont as "FreKote 33" (a Trademark of FreKote, Inc., Boca Roton, Fla.).

It will be appreciated by those skilled in the art that the method of constructing a contamination-resistant valve as disclosed herein by injecting a fluoropolymer resin into a valve housing with a valving element and mold fittings in place produces a lining which has no break lines in an extremely easy manner. A valve produced by the method of this invention needs no additional valve seat, the fluoropolymer providing a valve seat which is bidirectional to the full rating of the valve. Also, in the construction of this valve, although a highly corrosion resistant valve is created, it is not necessary to construct the various parts of the valve to a high degree of tolerance because the molten fluoropolymer resin simply fills cavities and thereby compensates for variances in tolerances. Thus, a precision valve is created, by a method which, of its nature, is not percision and is therefor less expensive.

One tremendous advantage of the method of this invention over prior art methods is that in most prior art methods separate protection facing rings about the fluid passage must be welded to the valve body. Such welding creates splatter which then must be cleaned from the outsides of the valve body. In the case of knife gate valves of the type described herein, this weld splatter must be particularly cleaned from the pipe-mounting holes 32. When using the method of this invention, since the sealing rings 76 are molded about the fluid passage, there is no weld splatter which saves a vast amount of cleaning time.

One benefit of the method of this invention is that it creates a superior valve in which the gate 46 slides easily and snuggly in the "in place" molded liner. Further, the method of this invention automatically leaves a packing cavity, which is the only opening from which leakage could occur (since the body is otherwise sealed), in which packing can be inserted.

It will be understood by those skilled in the art that various changes in form and detail may be made therein without departing from the spirit and scope of the invention. For example, it might be possible to use a dummy mold fitting in place of the actual valve gate 46, however, if this is done, one takes a chance of not getting as good a fit and the gate must then be manufactured to more exact tolerances. One benefit of using this alternative method would be that the gate could be constructed of a less expensive metal which is also coated by a fluorocarbon or fluoropolymer resin.

Embodiments of the invention in which an exclusive property or privilge are claimed are defined as follows:

1. A method of constructing an elongated knife gate valve of the type including an elongated relatively flat, valve body defining a relatively flat valve cavity therein and having first and second side openings in sides thereof located near one end thereof through which fluid controlled by said valve flows and having a third, end, opening located at the other end through which a flat knife gate is normally linearly moved to positions into and out of the valve cavity for allowing and disallowing fluid flow between said first and second openings, said method comprising:

extending a valve-gate means having dimensions which are essentially the same as those of the dimensions of the knife gate through said third opening to a position in said valve cavity between said first and second openings with its innermost tip extending beyond said first and second openings for forming a knife-gate cavity including a knife-gate track extending from near said third opening to beyond said side opehings in a resinous material in which said knife gate can be linearly moved via said third opening to a position at which said knife gate can block fluid flow between said first and second openings and a valve seat;

attaching first and second removable mold fixtures at each of said first and second openings respetively for covering said openings and thereby preventing undue amounts of liquid resinous material from flowing out of said first and second openings said removable mold fixtures mounted at said first and second openings having projections for defining a fluid passage between said first and second openings;

attaching a third mold fixture as said third opening to prevent liquid resinous material from flowing out of said third opening, said third mold fixture including a packing extension thereon for projecting into said third opening a substantial distance, the dimensions of said packing extension being such as to leave a small space between outer surfaces of said packing extension and inner surfaces of said valve body between which a packing liner can be formed;

injecting a hot molten resinous material into said valve cavity so as to surround said first and second openings and to substantially fill the unoccupied spaces of said entire valve cavity around said valve-gate means, including spaces positioned laterally outwardly from and completely surrounding said first and second side openings as well as said space between outer surfaces of said packing extension and inner surfaces of said valve body, and thereafter allowing said valve body, said mold fixtures, said valve-gate means and said resinous material to cool to thereby harden the resinous material to form a one-piece valve liner with a lined fluid passage through and between said first and second openings, said knife gate track in which said kinfe gate is normally linearly moved through said third opening to positions to open and close said fluid passage between said first and second openings, valve seats positioned between said knife gate and said body sides along which said knife gate is linearly moved by force applied via said third opening and against which said gate is laterally urged by fluid pressure to provide a fluid seal in either of two opposite directions, and a lined packing cavity at said third opening;

removing said first, second and third mold fixtures;

positioning a knige gate through said third opening in said valve cavity;

inserting through said third opening a packing material into said lined packing cavity formed by said packing extension in said resinous material so as to surround said knife gate with said packing material; and, fastening a slotted cap to said valve body at said third opening to allow passage of said valve gate through said third opening, but to hold said packing in place in said lined packing cavity.

2. A method as in claim 1 wherein said projections on said removable mold fixtures mounted at said first and second openings contact said valve-gate means to hold it in a proper position when said molten resinous material is injected into said valve cavity.

3. A method as in claim 1 wherein said removable fixtures at said first and second openings include grooves extending over the external surface of said body about said first and second openings to form contact plates of said resin about said first and second openings for flanges.

4. A method as in claim 1 wherein said third mold fixture mounted at said third opening is shaped to create said lining for said lined packing cavity to extend to said third opening.

5. A method as in claim 4, wherein said third mold fixture is shaped to create said lining for said lined packing cavity to form a sealing ring outside said third opening which seals said lined packing cavity with said slotted cap.

6. A method as in claim 1 wherein the resinous material is a fluoropolymer.

7. A method as in claim 1 wherein said third mold fixture at said third opening is not integral with said valve gate means and includes a slot in the packing extension thereof through which said valve-gate means is extended into said valve cavity.

8. A method as in claim 7 wheein said valve-gate means is said knife gate.

9. A method as in claim 1 wherein is further included the step of separately heating said valve body, said mold fixtures and the enclosed valve gate means prior to injecting a molten resinous material into said valve body.

* * * * *